United States Patent [19]

Braren

[11] 4,050,331
[45] Sept. 27, 1977

[54] CYCLOIDAL GEARS

[76] Inventor: Rudolf Braren, Kienaderweg 17, 8061 Gunding, Germany

[21] Appl. No.: 595,729

[22] Filed: July 14, 1975

[30] Foreign Application Priority Data

July 12, 1974  Germany .......................... 2433675

[51] Int. Cl.² .............................................. F16H 1/28
[52] U.S. Cl. ................................................... 74/804
[58] Field of Search .............................. 74/804, 805

[56] References Cited

U.S. PATENT DOCUMENTS

| 1,694,031 | 12/1928 | Braren | 74/804 |
| 1,910,777 | 5/1933 | Soddy | 74/804 |
| 2,508,121 | 5/1950 | McIver | 74/804 |
| 2,972,910 | 2/1961 | Menge, Sr. | 74/804 |
| 3,037,400 | 6/1962 | Sundt | 74/804 |
| 3,073,184 | 1/1963 | Braren | 74/804 |

FOREIGN PATENT DOCUMENTS

| 1,090,292 | 3/1955 | France | 74/804 |
| 880,828 | 5/1953 | Germany | 74/804 |
| 859,552 | 12/1952 | Germany | 74/804 |

*Primary Examiner*—Samuel Scott
*Assistant Examiner*—Lance W. Chandler
*Attorney, Agent, or Firm*—Craig & Antonelli

[57] ABSTRACT

A planetary gear arrangement which includes at least one planet wheel moved by way of an eccentric and at least one further wheel concentrically disposed with respect to the planet wheel. The planet wheel and further wheel are brought into engagement by a closed cam plate cycloid provided on one wheel and a ring of rollers provided on one wheel and a ring of rollers provided on the other wheel. The contact points of the rollers with the cam plate describe points of a reference cycloid with both the cam plate cycloid and the reference cycloid having a predetermined mathematical relationship.

18 Claims, 8 Drawing Figures

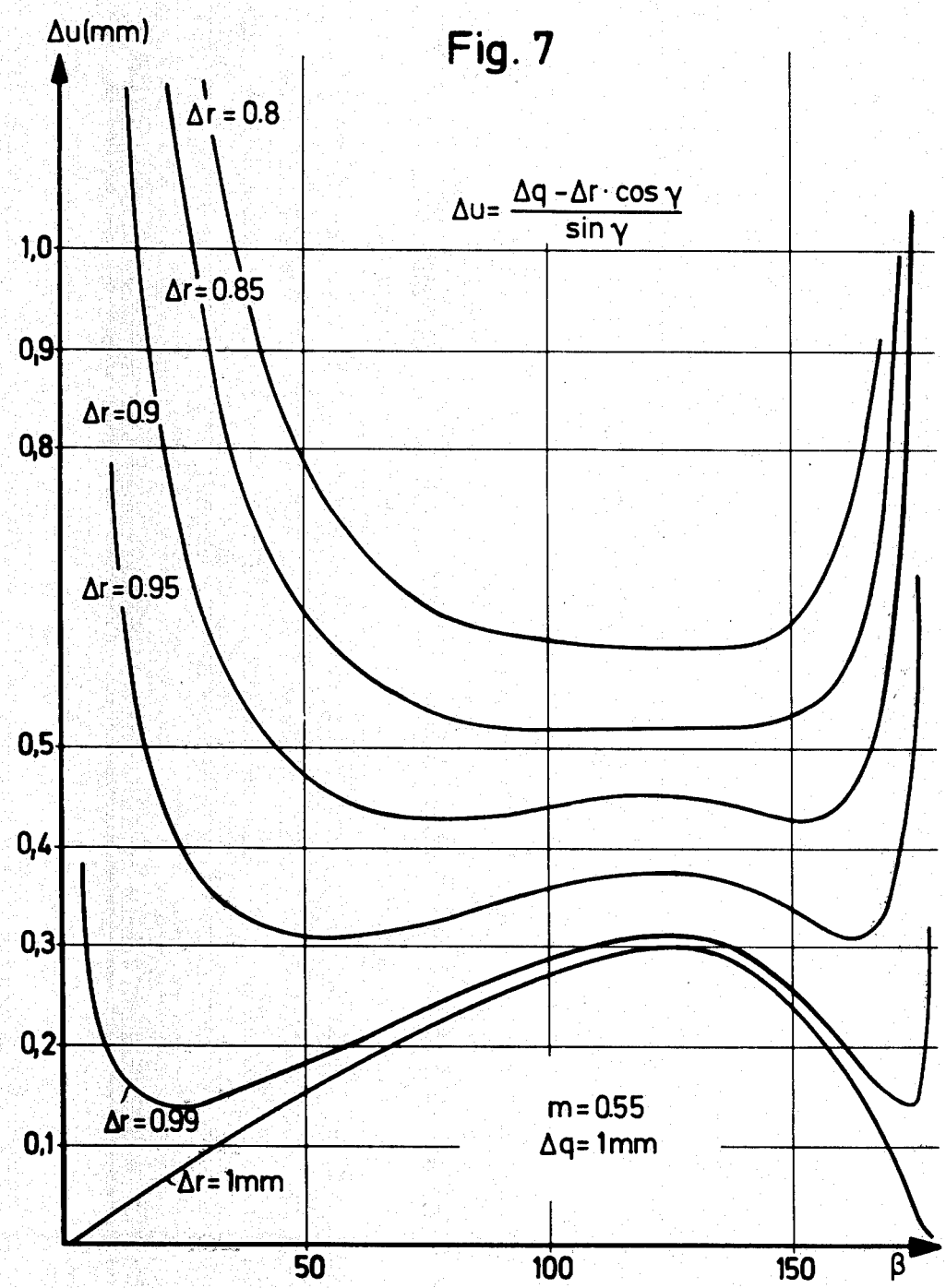

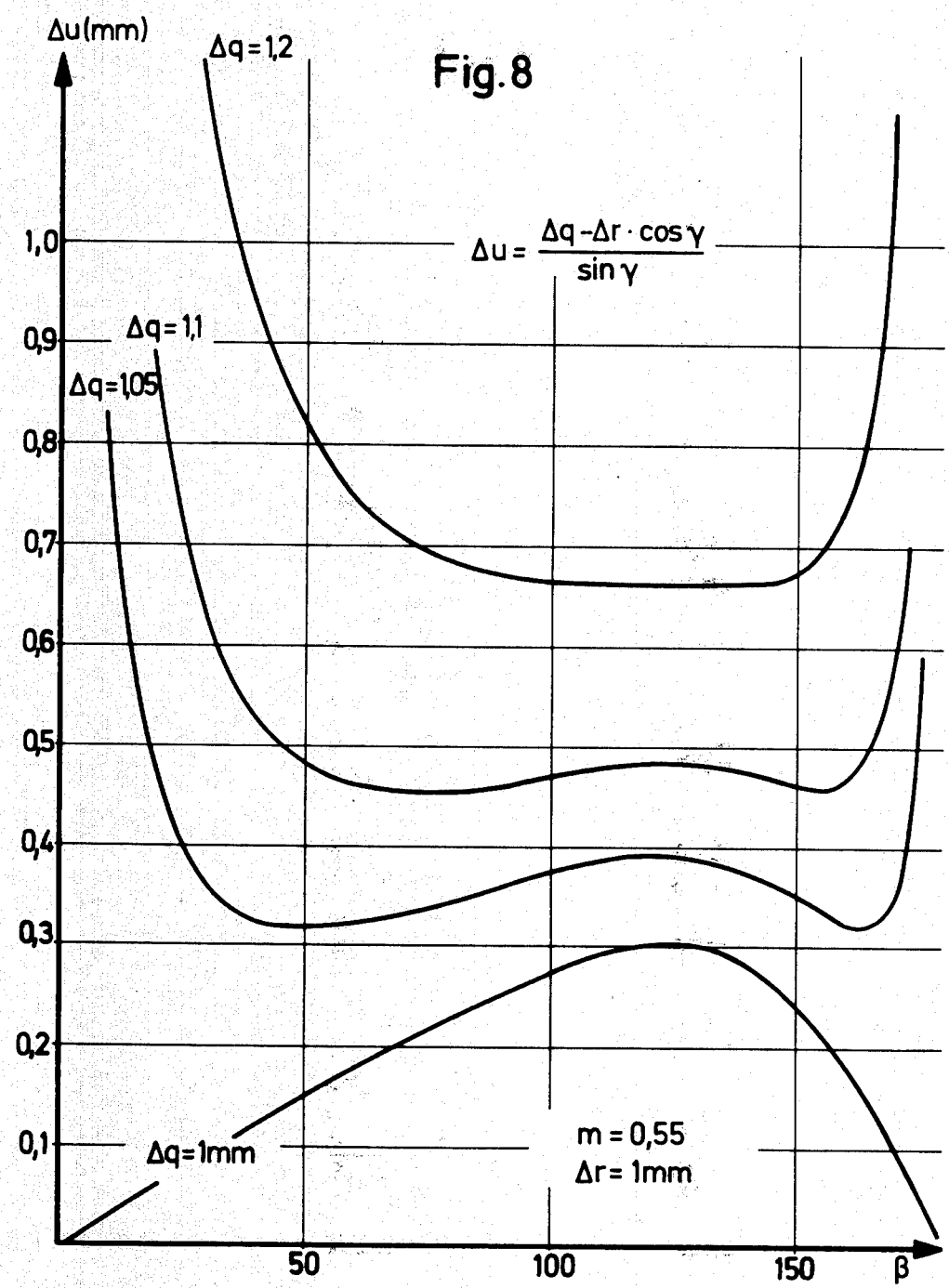

CYCLOIDAL GEARS

The present invention relates to cycloidal gears.

Planetary gears are known wherein at least one planet wheel, moved with the aid of an eccentric, engages either from the inside or outside at least one concentric central wheel. A cam plate or disc defining a closed cycloidal curve is associated with the planet wheel and the central wheel either between a inner epicycloidal curve and an outer ring of rollers or between an inner ring of rollers and a outer hypocycloidal curve. The number of rollers of the outer ring of rollers or the number of curve portions of the outer hypocylodial curve is one greater then the number of curve portions of the inner epicycloidal curve or the number of rollers of the inner ring of rollers.

In order to explain the closed cycloidal curve for a planet wheel in the form of a cam plate of the gear type described hereinabove, reference is made to FIG. 3 of the accompanying drawings, which shows one of the possibilities of kinematic generation of equidistants of a shortened epicycloid. As shown in FIG. 3, a rolling circle of radius $b$ rolls without sliding on the outer circumference of a fixed base circle of radius $a$, were $a/b = z$. The line $a + b = r$ moves around the centre M with an angular velocity $\omega_\alpha$ and the rolling circle moves about a centre B with angular velocity $\omega_\beta$. A point C in the plane of the rolling circle with the spacing $e = BC$ describes a shortened epicycloid on a fixed plane $x$-$x$, — shortened because C is not located on the periphery of the rolling circle. An equidistant to this shortened epicycloid is generated by the line $n$ perpendicular to the shortened epicycloid, which line passes via the point of tangency A of the rolling circle with the fixed base circle from the point C to a point N. The generating point Q of the equidistant is located on the perpendicular line $n$, and has a constant spacing $q$ from point C. The line $n$ makes an angle $\gamma$ on each side of the line MB $= r$. This angle $\gamma$ is a maximum when the line MN $=$ e.z. is perpendicular to $n$; e.z. is parallel to $e$. FIG. 3 shows only a half curve portion from an apex S to a valley point T. The ratio of the radii $a$ to $b = z$, or the ratio of angle $\beta$ to $\alpha = z$ is made integral so that a closed cycloidal curve of integral curve portions is obtained. From FIG. 3 the mathematical description of the equidistant curve can be as follows:

$$x = r\cos\alpha \pm e\cos(\beta \pm \alpha) \mp q\cos(\gamma \pm \alpha)$$

$$y = r\sin\alpha + e\sin(\beta \pm \alpha) - q\sin(\gamma \pm \alpha)$$

The transmission angle $\gamma$ is derived as follows:

$$\gamma = \text{arc tan}(\sin\beta / (1/m + \cos\beta))$$
Here: $m = e(z \pm 1)/r$ is the shortening ratio.

In these equations the upper sign applies for an epicycloid (FIG. 3) and the lower sign for a hypocycloid, for the generation of which the rolling circle rolls on the inner periphery of a base circle.

The kinematic significance of the three parameters $r$, $e$ and $q$ can be gathered from this mathematical description; however, reference is made to FIG. 4 of the accompanying drawings to provide a better explanation of the interaction of the cam plate with the corresponding ring of rollers in the case of the gear types described hereinbefore. On the lefthand side of FIG. 4 are shown the epicycloids and their equidistants for a given ring of rollers, while on the right-hand side of the figure are shown the hypocycloids with their equidistants for the same ring of rollers. The base circles of the two cams are again designated by $a$ or $a'$, and their rolling circles by $b$ or $b'$. The centre of the ring of rollers is O, that of the cams M, that of the rolling circles B and that of the rollers C. The line OM is equal to $e$, and thus the eccentricity or crank is of the same length and parallel to line $BC = e/$.

The angular velocity $\omega\beta$ induced in the point O generates in the point M a velocity vector in the same direction as the tangential force F = induced torque/$e$.

As a result the cam is rotated about its centre M in the directions $\omega_d$ or $\omega_d'$ because it abuts the fixed ring of rollers. Power transmission can only take place perpendicularly to the tangential surfaces. The perpendicular of a cycloid must, however, pass in known manner through the tangency point A or A' of the rolling circle and base circle. Therefore these perpendiculars are provided by the straight lines CA or C'A' whose extensions meet at the instantaneous pole N or N'.

As the rollers of the ring of rollers have their centres in C and their radii correspond to the constant equidistant spacings $q = CQ$ or $q' = C'Q'$, the perpendiculars must also pass through the points Q. In this connection reference is made to FIG. 3 which shows a roller by means of phantom lines. The points Q represent on the one hand the generating points of the cam plate and on the other the tangency points of the cam plate with the rollers of the ring of rollers, and thus determine kinematically in each of the gear types described hereinbefore two cam curves. This view, that the tangency points of the rollers also describe a cycloidal curve, is not found in the prior art.

The mathematical equidistant curve of a shortened cycloid which is associated with the cam path of the cam plate is referred to as a cam plate cycloid, and the imaginary mathematical equidistant path of a shortened cycloid which relates to the tangency points of the rollers of the ring of rollers is referred to as a reference cycloid.

Accordingly in the case of a gear with epicycloids or hypocycloids the cam plate cycloid is located inside or outside the reference cycloid, respectively.

In practical constructions of cycloidal gears, viewed from a purely mathematical consideration ignoring such factors as, for example, manufacturing tolerances, elasticity and thermal expansion. By virtue of the pure mathematical consideration of the gear, the cam plate cycloid and reference cycloid are identical and therefore their parameters are also identical. Thus the reference cycloid parameters are unsuitable for generating a cam plate cycloid to be used in a practical gear.

To overcome this difficulty, it has been proposed in German Pat. Nos. 464,992 and 459,025 to empirically correct the cam plate cycloid in such a way that a cam plate cycloid which was reduced in size relative to the reference at the cycloid or increased in size relative to the reference hypocycloid was produced and was then cut away in the area of the apex and valley points. However, the afore-mentioned corrective procedure leads to the shortcoming in the practical operation of the gear that, due to the removed or corrected portions of the cam path only one or two outer rollers come into bearing engagement on the cycloidal curve during one rotation of the eccentric, due to the fact that there are no equal spacings in the peripheral direction from the individual cam portions to the particular outer rollers. Consequently a limited small zone of the whole cam path must absorb the entire load transmission.

A further shortcoming of the proposed procedure resides in the fact that non-uniform performance with vibration, particularly at high speeds, owing to the fact that in operation the instantaneous pole N of the cam plate cycloid and the reference cycloid undergoes kinematic deflections from its running pole path of radius e.z. and its stopping pole path of radius $e(z + 1)$.

Another shortcoming of the prior art solutions resides in the fact that impacts occur after passing through the apex point S when a cam portion engages with a roller and also large rotation reversal tolerances are exhibited which cannot be predetermined.

The present invention is concerned with the task to provide gears of the aforementioned type, wherein the above-mentioned shortcomings of the known gears are substantially eliminated.

The underlying problems are solved in accordance with the present invention by providing a planetary gear comprising at least one planet wheel moved with the aid of an eccentric and at least one concentric wheel, said wheels engaging by means of a closed cam plate cycloid constructed on one wheel and a ring of rollers constructed on the other wheel, and the tangency points of the rollers with the cam plate cycloid describing points of a reference cycloid whereby both cycloids can be mathematically expressed as follows:

$$x = r\cdot\cos\alpha \pm e\cdot\cos(\beta \pm \alpha) \mp q\cdot\cos(\gamma \pm \alpha)$$

$$y = r\cdot\sin\alpha + e\cdot\sin(B \pm \alpha) - q\cdot\sin(\gamma \pm \alpha)$$

where the parameters are defined in the terms set forth hereinabove, and wherein the value of the parameter $q$ for the cam plate cycloid is larger than for the reference cycloid, and the value of the parameter $r$ in the case of the construction of the cam plate cycloid as an epicycloid is larger, and in the case of the construction of the cam plate cycloid as a hypocycloid is smaller than for the reference cycloid.

By shaping of the cam plate cycloid relative to the reference cycloid according to the present invention, which is manifested by an enlargement of the cam flank, a considerable increase in the engagement zone is obtained which can be many times the value obtained in prior art constructions. In practical running of a gear in accordance with the present invention, shortly after the apex point position, a smooth engagement is obtained between the particular cam portion and the adjacent roller which, as rotation proceeds, is effected uniformly over almost the the whole cam flank between apex and valley. As a result of this uniform bearing, it can be seen that almost half the rollers are in load-transmitting engagement with the associated cam flanks. The engagement zone is consequently extended in that, on a correspondingly large number of flanks, a correspondingly large number of rollers engage in tangency zones which are slightly displaced from one cam portion to the next. This can also be explained by the imaginary projection of all the tangency zones of all the simultaneously engaging rollers on one cam flank, which is illustrated in FIGS. 5 and 6. Obviously, initially there is a tolerance between the rollers and cam portions to be brought into engagement, and the above-described load transmission conditions come into play after covering a rotation reversal angle.

The increased engagement zone which is considerable relative to the prior art means that a gear of the same order of size can now transmit considerably higher torques, or a gear for the same practical functions can now be made considerably smaller in a construction according to the invention. Practical tests have shown that the engagement zone may be increased by five times as compared with the value achieved in conventional gear constructions therefore, the gear according to the invention can be constructed five times smaller.

Furthermore, the more uniformly it is possible to rotate the instantaneous poles of the two cycloids the quieter and generally better a cycloid gear can operate. The instantaneous poles of known gears of the above-mentioned type are in fact relatively close to one another, but they break away from the prescribed circular paths. Although, with the parameter dimensioning according to the invention, the instantaneous poles of the two cycloids are initially further apart than in the conventional gears, after eliminating the reversal tolerance they substantially coincide and in this position jointly rotate on the circular stopping pole path. For a more detailed discussion of the significance of this procedure, reference is made to German Patent No. 1,087,865. It is clear that by this procedure a much more uniform and quieter operation of the gear is obtained.

Additionally, an advantage of the parameter dimensioning according to the invention resides in the fact tht the individual rollers are permitted to run from the unloaded into the loaded state in such a continuous manner that impacts such as observed in prior art constructions after passing through the apex point are substantially eliminated. This also contributes to much quieter running and an increase in the life of the gear.

The considerable reduction in frictional losses are realized by the gear construction of the present invention with such losses being far smaller than the losses of known cycloid gears which are themselves comparatively small.

According to the present invention, it is possible to develop a cam plate on the back of the rotation reversal tolerance, which is always present and which can be expressed as an angle $\delta$ but also in the form of zones $\Delta\mu$, which occur between the rollers and their associated points of tangency with the cam plate. The invention can be expressed mathematically also by this ability of the planet wheel and the central wheel to rotate against each other in zones $\Delta\mu$ as a function of the roller angle $\beta$, for example according to the following equation:

$$\Delta\mu = (\Delta q - \Delta r\cdot\cos\gamma/\sin\gamma);$$

where:

$\Delta\mu$ = rotation zones, as mentioned above;
$\Delta q$ = difference of the values for the parameters $q$
$\Delta r$ = the difference of the values for the parameters $r$
$\gamma$ = arc tan (sin $\beta/1/m$ + cos $\beta$).

According to a further development of the present invention, it is possible to proceed in such a way that the cam plate cycloid is constructed with a larger parameter value $e$ than the reference cycloid. As a result it is possible to compensate bearing clearances and elastic deformations of the drive shaft.

According to a further preferred feature of the present invention, when dimensioning the parameter values $r$ and $q$ it is possible to proceed in such a way that the difference of the parameter value $r$ is to the difference of the parameter value $q$ as $\sqrt{(1+m^2)}-1$ is to $1-\sqrt{(1-m^2)}$ with the shortening ratio $m = e/b$. The difference in the parameter values $r$ and $q$ is here understood to mean the difference between, for example, the parameter value $r$ of the reference cycloid from that of the parameter $r$ of the cam plate cycloid, whereby the same consideration applies for $q$.

A further advantageous feature is obtained by the present invention by the possibility of minimizing the rotation reversal tolerance according to the following equation:

$$\delta = (1 \pm 1/n) \cdot (\arccos(-m) - \arccos(-m_1))$$

where:

$m$ = shortening ratio of the reference cycloid; and
$m_1$ = shortening ratio of the cam plate cycloid.

It is finally possible with a view to obtaining the minimum contact pressure to fix parameter values particularly relative to the shortening ratio $m$ and the equidistant $q$.

According to a preferred embodiment of the present invention, an automatic possibility of reducing the contact pressure is provided by making the equidistant $q$ more or less the same size as the smallest radius of curvature of the reference cycloid occurring adjacent to the inflection point of the cam flank and, consequently, in the area of greatest contact pressure. As the divergencies are only very small, it is possible to use the cam plate cycloid as a basis instead of the reference cycloid.

These and other objects, features and advantages of the present invention will become more apparent from the following description when taken in connection with the accompanying drawings which show, for the purposes of illustration only, several embodiments of cycloidal gear arrangements in accordance with the present invention and wherein:

FIGS. 7 and 8 are diagrams for the illustration of the relation:

$$\Delta \mu = (\Delta q - \Delta r \cdot \cos\gamma / \sin\gamma)$$

Figure 1:
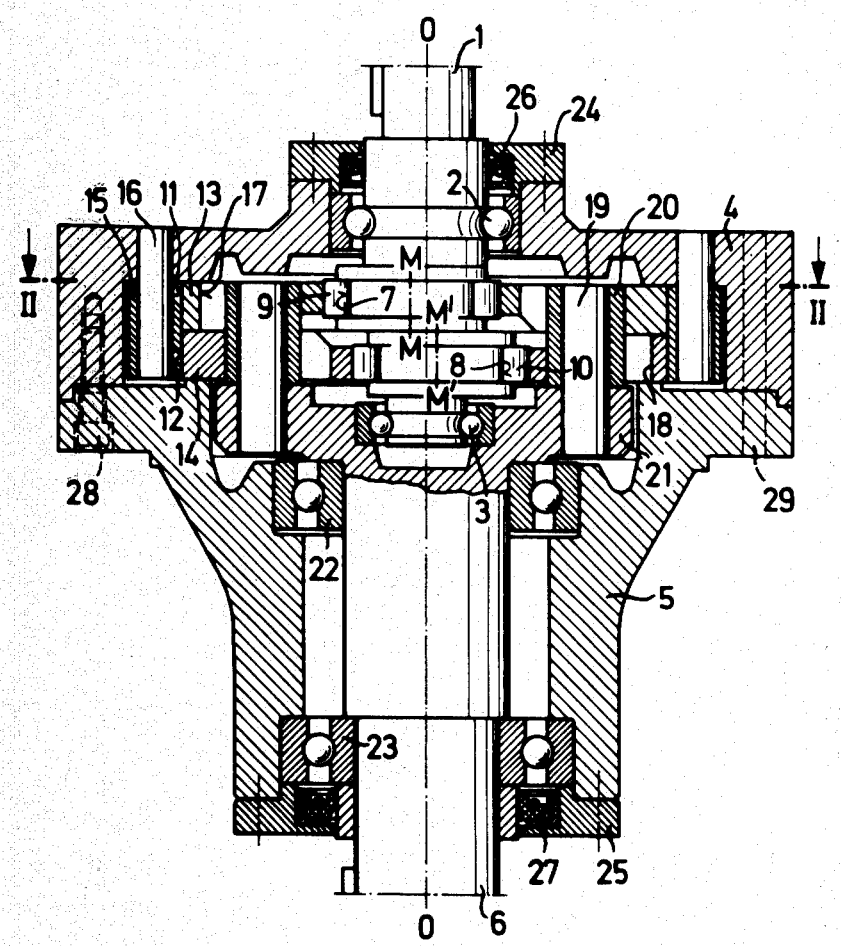
FIG. 1 is a longitudinal partial cross-sectional view through an embodiment of a gear in accordance with the present invention.

Referring now to the drawings, wherein like reference numerals are used through the various views to designate like elements and, more particularly, to FIG. 1, according to this figure, a shaft 1 is centrally mounted by ball-bearings 2, 3 in a two-part housing 4, 5 and in a shaft 6. Two eccentric tracks 7, 8 of eccentricity $e = OM, OM$, respectively, which are displaced relative to one another by 180° are arranged on the shaft 1. Cam plates 13, 14 are each provided with a closed cycloidal curve 11, 12 on its outer edge and are mounted on eccentrics 7, 8, via rollers 9, 10. The closed cycloidal curves 11, 12 rollingly engage rollers 15 on bolts 16, which bolts are secured concentrically around the central axis O—O of housing 4. Bores 17 or 18 are provided in cam plates 13 with the centre of the bores disposed on a circle concentric with the respective central axis M-M or M'-M of the cam plates. Rollers 20 engage the bores 17, 18. The rollers 20 are mounted on bolts 19 which are fixed concentrically about rotation axis O—O in a flange 21 of shaft 6. The shaft 6 is mounted in housing portion 5 by means of ball-bearings 22, 23. The housing comprising members 4 and 5 is closed by covers 24, 25 in known manner and is sealed to the outside by means of seals 26, 27. Screws 28 can be used to fix the housing protions 4, 5 together and bores 29 can be used to mount the gear.

It is understood that, depending on the intended application of the gear, one or two of the members 1, 6, 4 or 5 can be driven.

Figure 2:
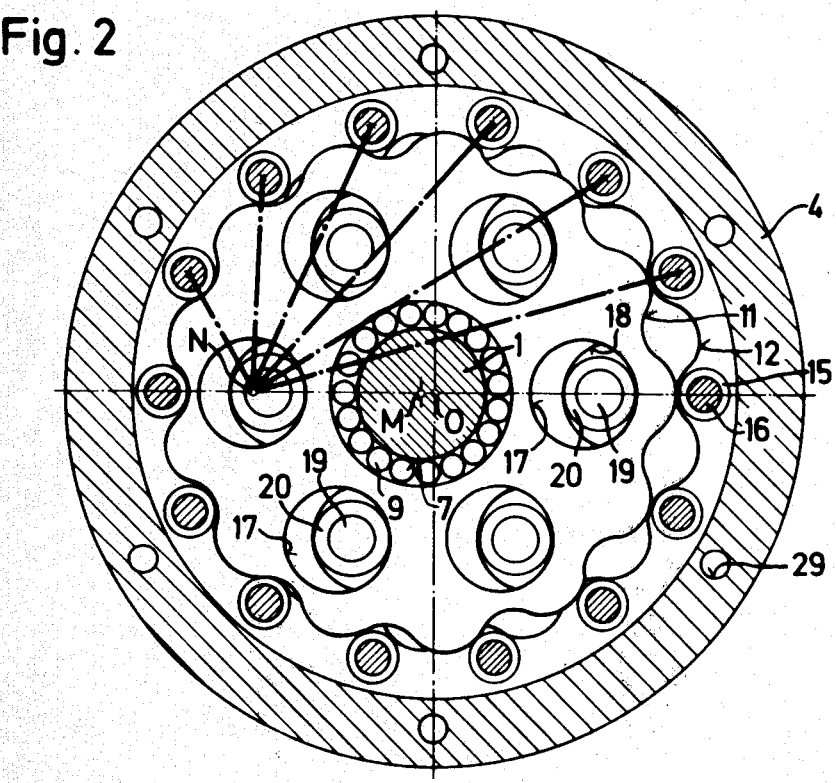
FIG. 2 is a cross-sectional view taken along the lines II—II of FIG. 1.

The gear construction per se is known and has been used with known cycloid dimensions. However, in FIG. 2 by means of the common instantaneous pole N for the rollers of a semi-circle, is illustrated what is to be obtained with the dimensioning of parameters $r$ and $q$ in accordance with the invention. As already described in detail hereinabove, after traversing the rotation reversal tolerance the instantaneous poles of both cycloids concide and together pass through the circular stopping pole path.

Figure 3:
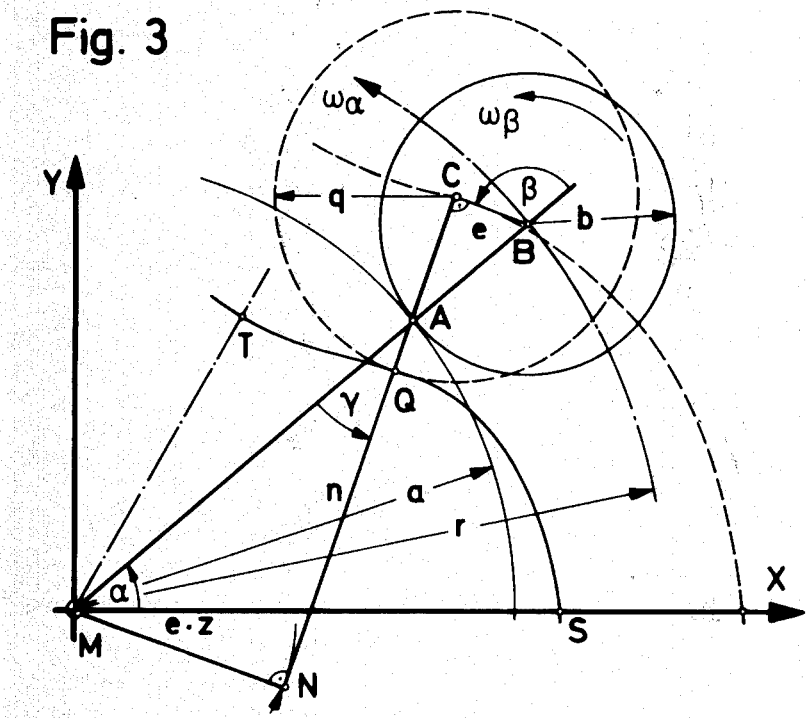
FIG. 3 is a schematic diagram for developing an epicycloidal path.
Figure 4:
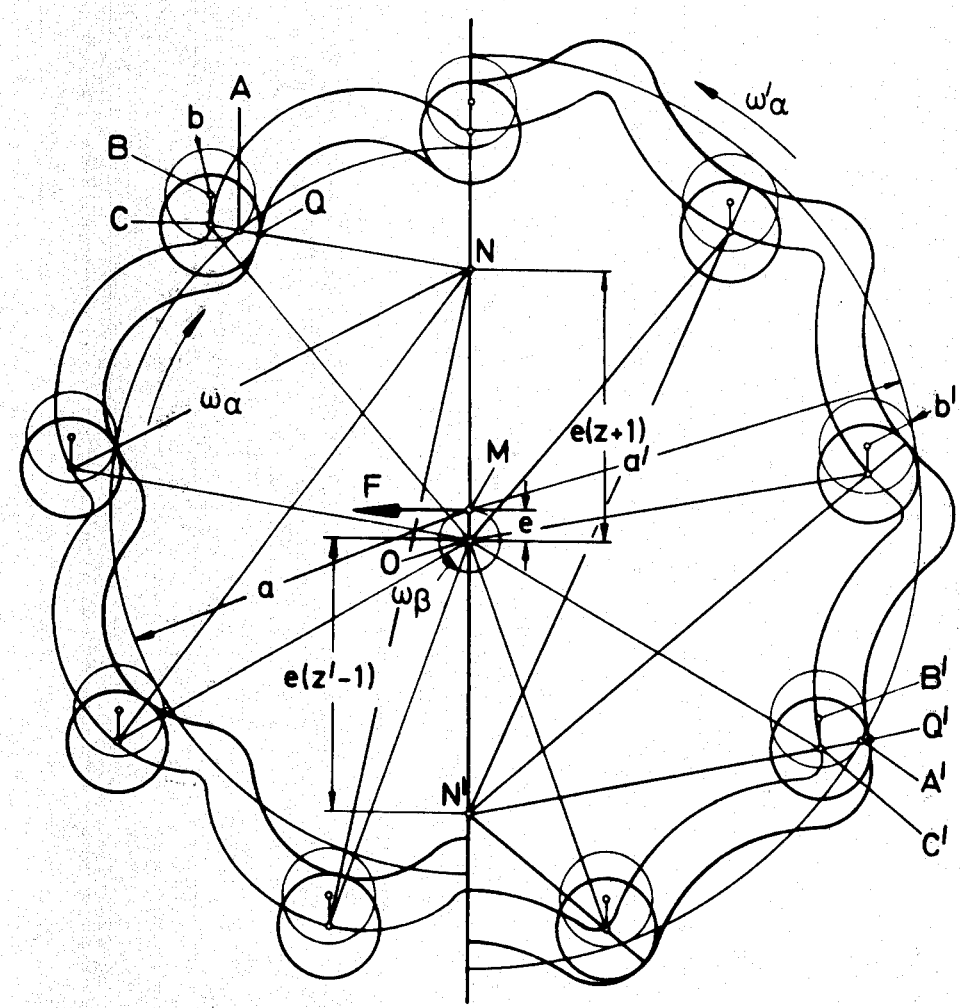
FIG. 4 is a schematic representation illustrating the association of a roller flange and epicycloid on the left and a roller flange and hypocycloid on the right.
Figure 5:
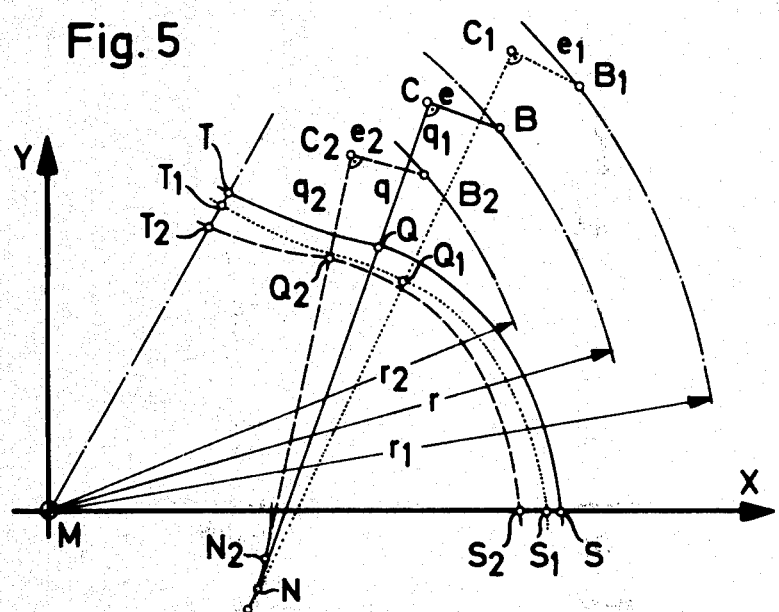
FIG. 5 is a diagram of cam flanks of epicycloids with parameters values $r$ and $q$ which are altered in comparison with a reference cycloid, to be viewed in connection with the first solution.

FIG. 5 illustrates a few flanks of epicycloids whose development corresponds to that illustrated in FIG. 3. In FIG. 5, the reference cycloid has the parameters $r$, $e$ and $q$ and is used in practical gears as a geometrical location for tangency points of the rollers with the associated cam plate cycloid, whereby all the tangency points are projected on a single flank.

In addition, in FIG. 5, a cycloid flank is shown which is corrected in known manner which can be expressed more or less by reducing the parameter values $r_2$ and $q_2$ relative to $r$ and $q$ of the reference cycloid. The reference numerals in the conventional cam flank are designated by the subscript 2. It can be seen that the conventional cam flank 7 exhibits a steeper, more curved flank profile.

Furthermore, in FIG. 5, a third cam is the extended flank profile according to the present invention. The reference numerals of the third cam flank are designated by the subscript 1.

Certain characteristic points are given for each cycloid, e.g. the common centre M, the apex points S, $S_2$, $S_1$, the valley points T, $T_2$, $T_1$, the centres of the cycloidal paths B, $B_2$, $B_1$, the generating points of the shortened cycloid C, $C_2$, $C_1$, the generating points for the equidistants C, $C_2$, $C_1$, as well as the particular instantaneous poles N, $N_2$ and $N_1$.

Figure 6:
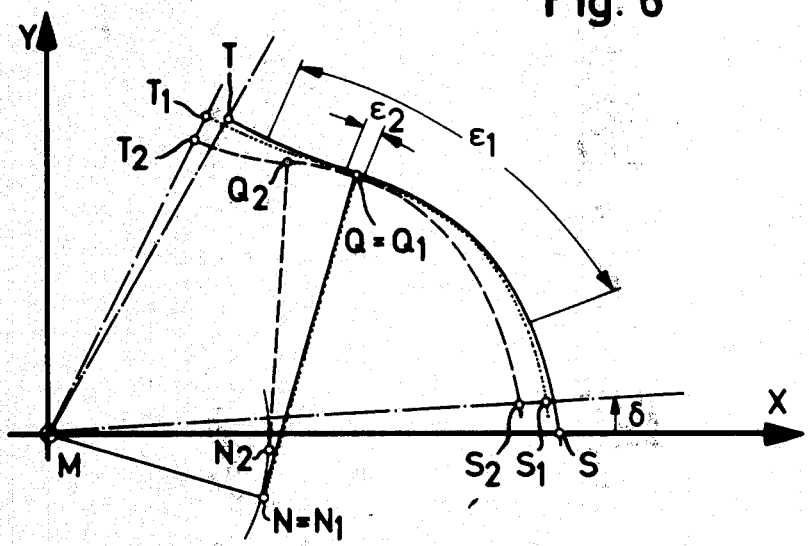
FIG. 6 is a diagram of the cam flanks of FIG. 5, after they have undergone a rotation reversal tolerance.

FIG. 6 illustrates the flank profiles described in FIG. 5 in their arrangement after passing through the rotation reversal tolerance which is represented as the rotation about the point M with the rotation reversal angle $\delta$. It is hereby assumed that in a practical epicycloidal gear, the reference flank profile of the reference cycloid is associated with the roller flange, and is maintained in the same form and position on the x-y plane. The two other flank profiles are associated with two different cam plates which owing to the necessary manufacturing tolerances must have a clearance and only engage with the reference cycloid after traversing the rotation tolerance. As already stated in connection with FIG. 5, one cam plate cycloid is of a known kind and the other cam plates are constructed according to the present invention.

On rotating the two cam flanks constructed in accordance with the present invention about the rotation reversal angle δ the instantaneous pole $N_1$ of the cycloid constructed according to the invention moves so as to coincide with the instantaneous pole N of the reference cycloid, while the instantaneous pole $N_2$ of the cam plate cycloid constructed in conventional manner moves still further away from the instantaneous pole N of the reference cycloid than was the case, as shown in FIG. 5, before covering the rotation reversal angle of N.

All three flank profiles are contiguous in the area of their points of inflection, whereby the known steep flank profile has a short engagement zone $\epsilon_2$ in common with the reference flank profile. The flank profile which is extended in accordance with the invention coincides with the reference flank profile over a much longer engagement zone $\epsilon_1$.

As indicated hereinabove the present invention can also be represented differently, namely, by the distance values $\Delta\mu$ occurring between the rollers and their respective contact points on the cam plate or disk. In this connection, the following relationship applies:
$$\Delta\mu = (\Delta q - \Delta r \cos\gamma / \sin\gamma)$$

FIGS. 7 and 8 clarify this dependency of the rotary distance $\Delta\mu$ as seen over the rolling angle $\beta$, namely when varying the parameters $\Delta q$ and $\Delta r$. For purposes of simpifying the drawings, the procedure was such that the illustration was based on different $\Delta r$ with constant $\Delta q$ and, conversely, on different $\Delta q$ with constant $\Delta r$. With respect to the reference cycloid, respectively both parameters are varied.

Since the parameters $\Delta q$ and $\Delta r$ are respectively zero for the case of the reference cycloid, the value zero results for $\Delta\mu$; thus, the abscissa stands for the relationships of the reference cycloid.

It can be seen from the above that the sections extending extensively in parallel to the abscissa, which represent after all a constant rotary distance with respect to the reference cycloid, ensure a very uniform behavior of a transmission which, though, is under a relatively minor load. If the range of higher loads is entered, the load distribution can be considered which would occur at the reference cycloid. For the force distribution along the reference cycloid is not constant, but rather has a maximum lying approximately in the zone of the turning point between the valley and the peak of the flank. If the rotary distance is increased in this zone, then the adjoining zones, i.e., the rollers adjacent as seen in the peripheral direction, must perforce participate in carrying a larger portion of the total load; this affords the possibility of being able to distribute the load more uniformly over the course of the flank and/or simultaneously over sveral rollers. Among the represented curves, those having such a $\Delta\mu$ behavior can be observed. It is to be kept in mind that the cycloid transmissions known heretofore do not even exhibit the load distributions as yet as they apply to the reference cycloid. The loads in the conventional transmissions are even more greatly limited to a narrow flank zone.

The groups of curves, represented merely as examples, already demonstrate that a large variety of adaptation possibilities to respectively desired conditions is available within the scope of the teachings of this invention. Above and beyond the aforementioned favorable power or force distribution and/or the uniform, low-noise operation of the transmission, rotation reversal tolerances can be provided, and additional measures can be taken which are covered by the scope of the dependent claims.

What we claim is:
1. A planetary gear comprising at least one planet wheel moved with the aid of an eccentric and at least one concentric wheel, said wheels engaging by means of a closed cam plate cycloid constructed on one wheel and a ring of rollers constructed on the other wheel, and the tangency points of the rollers with the cam plate cycloid describing points of a reference cycloid whereby both cycloids can be mathematically expressed as follows:

$$x = r \cdot \cos\alpha \pm e \cdot \cos(\beta \pm \alpha) \mp q \cdot \cos(\gamma \pm \alpha)$$

$$y = r \cdot \sin\alpha + e \cdot \sin(\beta \pm \alpha) - q \cdot \sin(\gamma \pm \alpha)$$

where:
$x, y$ = abscissa and ordinate of the plane of said cycloids;
$r$ = sum of the radii of a circle rolling without sliding on the outer circumference of a fixed base circle;
$\alpha$ = angle subtended between said abscissa and a line passing through the center of said cycloids, through a point of tangency of said rolling circle and fixed base circle, and through the center of said rolling circle;
$e$ = eccentricity of the gear arrangement;
$\beta$ = rolling angle;
$q$ = equidistant spacing;
$\gamma$ = transmission angle;
and wherein the value of the parameter $q$ for the cam plate cycloid is larger than for the reference cycloid, and the value of the parameter $r$ in the case of the construction of the cam plate cycloid as an epicycloid is larger, and in the case of the construction of the cam plate cycloid as a hypocycloid is smaller than for the reference cycloid.

2. A planetary gear as claimed in claim 1, wherein the cam plate cycloid has a larger value for the parameter $e$ than the reference cycloid.

3. A planetary gear as claimed in claim 2, wherein the difference of the values for the parameters $r$ to the difference of the values for the parameters $q$ for the reference and cam plate cycloids is as $\sqrt{(1+m^2)}-1$ to $1-\sqrt{(1-m^2)}$, where:
$m$ = the shortening ratio of the cycloids.

4. A planetary gear as claimed in claim 3, wherein a rotation reversal tolerance δ is minimized in accordance with the following equation:

$$\delta = (1 \pm 1/z) \cdot (\text{arc cos}(-m) - \text{arc cos}(-m_1)),$$

where:
$m$ is the shortening ratio of the reference cycloid and $m_1$ of the shortening ratio of the cam plate cycloid.

5. A planetary gear as claimed in claim 4, wherein the shortening ratio $m$ and the equidistant $q$ are chosen to give the smallest possible contact pressure.

6. A planetary gear as claimed in any of claim 4, wherein the equidistant $q$ is approximately the same size as the smallest radius of curvature occurring in proximity to the point of inflection of the cam flank of the reference cycloid.

7. A planetary gear arrangement comprising: at least one planet wheel, eccentric means for moving said planet wheel, at least one further wheel concentrically mounted with respect to said planet wheel means for engaging said at least one planet wheel and said at least one further wheel including a closed cycloid cam means provided on one of said planet wheel and said further wheel and roller means provided on the other of said planet wheel and said cam means defining contact points describing points of a reference cycloid, wherein both the reference cycloid and cycloid cam means are mathematically expressed in the following terms:

$$x = r\cos\alpha + e\cdot\cos(\beta + \alpha) - q\cdot\cos(\gamma+\alpha),$$
$$y = r\sin\alpha + e\cdot\sin(\beta + \alpha) - q\cdot\sin(\gamma+\alpha),$$

where:
- $x, y$ = abscissa and ordinate of the plane of said cycloids;
- $r$ = sum of the radii of a circle rolling without sliding on the outer circumference of a fixed base circle;
- $\alpha$ = angle subtended between said abscissa and a line passing through the center of said cycloids, through a point of tangency of said rolling circle and fixed base circle, and through the center of said rolling circle;
- $e$ = eccentricity of the gear arrangement;
- $\beta$ = rolling angle;
- $q$ = equidistant spacing;
- $\gamma$ = transmission angle;

and wherein the value of the parameter $q$ for said cam means is larger than the value $q$ for said reference cycloid, said cam means being constructed as an epicycloid cam plate with the value of the parameter $r$ being larger than the value of the parameter $r$ for the reference cycloid.

8. An arrangement according to claim 7, wherein said epicycloid cam plate has a large value for the parameter $e$ than the reference cycloid.

9. An arrangement according to claim 8, wherein the difference between the values for the parameter $r$ to the difference between the values for the parameter between the values for the parameters $q$ for the reference and said epicycloid cam plate is:

$$\sqrt{(1+m^2)} - 1 \text{ to } 1 - \sqrt{(1-m^2)},$$

where:
- $m$ = shortening ratio of the cycloids.

10. An arrangement according to claim 9, wherein a rotation reversal tolerance angle $\delta$ of the gear arrangement is minimized in accordance with the following:

$$\delta = (1+1/z) - (\text{arc}\cos(-M) - \text{arc}\cos(-M_1))$$

where:
- $z$ = ratio of the radius of the fixed base circle to the radius of the rolling circle,
- $m$ = shortening ratio of the reference cycloid,
- $m_1$ = shortening ratio of the epicycloid cam plate.

11. An arrangement according to claim 10, wherein the shortening ratio $m$ and the constant equidistant spacing $q$ are selected to provide the smallest contact pressure between said roller means and said epicycloid cam plate.

12. An arrangement according to claim 11, wherein the reference cycloid includes cam flank means, and wherein the equidistant spacing $q$ is substantially of the same size as the smallest radius of curvature occurring proximate to a point of inflection of said cam flank means of the reference cycloid.

13. A planetary gear arrangement comprising: at least one planet wheel, eccentric means for moving said planet wheel, at least one further wheel concerntrically mounted with respect to said planet wheel means for engaging said at least one planet wheel and said at least one further wheel including a closed cycloid cam means provided on one of said planet wheel and said further wheel and roller means provided on the other side of said planet wheel and said cam means defining contact points describing points of a reference cycloid, wherein both the reference cycloid and cycloid cam means are mathematically expressed in the following terms:

$$x = r\cdot\cos\alpha - e\cdot\cos(\beta - \alpha) + q\cdot\cos(\gamma-\alpha),$$
$$y = r\cdot\sin\alpha + e\cdot\sin(\beta - \alpha) - q\cdot\sin(\gamma-\alpha),$$

where:
- $x, y$ = abscissa and ordinate of the plane of said cycloids;
- $r$ = sum of the radii of a circle rolling without sliding on the outer circumference of a fixed base circle;
- $\alpha$ = angle subtended between said abscissa and a line passing through the center of said cycloids, through a point of tangency of said rolling circle and fixed base circle, and through the center of said rolling circle;
- $e$ = eccentricity of the gear arrangement;
- $\beta$ = rolling angle;
- $q$ = equidistant spacing;
- $\gamma$ = transmission angle;

and wherein the value of the parameter $q$ for said cam means is larger than the value $q$ for said reference cycloid, said cam means being constructed as a hypocycloid cam plate with the value of the parameter $r$ being smaller than the value of the parameter $r$ for the reference cycloid.

14. An arrangement according to claim 13, wherein said hypocycloid cam has a larger value for the parameter $e$ than the reference cycloid.

15. An arrangement according to claim 14, wherein the difference between the values for the parameter $r$ to the difference between the values for the parameter between the values for the parameters $q$ for the reference and said hypocycloid cam plate is:

$$\sqrt{(1+m^2)} - 1 \text{ to } 1 - \sqrt{(1-m^2)},$$

where:
- $m$ = shortening ratio of the cycloids.

16. An arrangement according to claim 15, wherein a rotation reversal tolerance angle $\delta$ of the gear arrangement is minimized in accordance with the following:

$$\delta = (1+1/z) - (\text{arc}\cos(-M) - \text{arc}\cos(-M_1)),$$

where:
- $z$ = ratio of the radius of the fixed base circle to the radius of the rolling circle,
- $m$ = shortening ratio of the reference cycloid,
- $m_1$ = shortening ratio of the hypocycloid cam plate.

17. An arrangement according to claim 16, wherein the shortening ratio $m$ and the constant equidistant spacing $q$ are selected to provide the smallest contact pressure between said roller means and said epicycloid cam plate.

18. A planetary gear arrangement comprising: at least one planet wheel, eccentric means for moving said planet wheel, at least one further wheel concentrically mounted with respect to said planet wheel, means for engaging said at least one planet wheel including a closed cycloid cam means provided on one of said planet wheel and said further wheel and roller means provided on the other of said planet wheel and said further wheel, said roller means and said cam engaging at contact points describing points of reference cycloid, wherein distance values $\Delta\mu$ occurring between said roller means and said contact points on said cam means and the reference cycloid, respectively, are defined as follows:

$$\Delta\mu = (\Delta q - \Delta r \cdot \cos\gamma/\sin\gamma),$$

where:
$\Delta q$ = difference of values of an equidistant spacing of the cam means and reference cycloid,
$\Delta r$ = difference of values of the sum of the radii of a circle rolling without sliding on the outer circumference of a fixed base circle respectively defining the cam means and the reference cycloid, and
$\gamma$ = the transmission angle.

* * * * *